United States Patent Office 3,436,225
Patented Apr. 1, 1969

3,436,225
METHOD OF TREATING BEER WITH ADSORBING AGENTS
Karl J. Raible, Munich, Germany, assignor to Aktiengesellschaft fur Brauereiindustrie, Basel, Switzerland
No Drawing. Filed July 27, 1964, Ser. No. 385,476
Claims priority, application Germany, Aug. 2, 1963,
A 43,747
The portion of the term of the patent subsequent
to Dec. 29, 1981, has been disclaimed
Int. Cl. C12h 1/04
U.S. Cl. 99—48       19 Claims

ABSTRACT OF THE DISCLOSURE

A process for the combined treatment of beer with aluminum silicates together with silica gel having specific physical properties.

---

Cross reference to related application

Pursuant to Title 35, United States Code, Section 120, this application is a continuation-in-part of the copending application Ser. No. 268,046, filed Mar. 26, 1963, in the name of Karl J. Raible, said copending application now being United States Patent 3,163,538.

Previously it has been proposed to employ for the treatment of beer a coarse to medium-pored silica gel with an inner surface of 200 to 600 $m.^2/g.$, a pore volume of 0.5–1.5 ml./g. and a pore diameter of 40–180 A., the grinding of which has been carried so that about ¾ of the material is of a size smaller than 40 microns. It has been found to be most favourable if the most finely ground silica gel still has some properties similar to coarse pored silica gel in such a sense that the inner surface is 200–400 $m.^2/g.$; the pore volume 0.6–1.2 ml./g.; and the pore diameter 60–150 A., and that it also exhibits a neutral to weakly acid reaction such that the product shows a pH value of 4.0 to 8.0 in a 5% aqueous suspension.

A most finely ground, coarse to medium pored silica gel adsorbs from the beer not only the alubmen compounds that account for the occurrence of turbidities, but it also has an adsorbing effect on the microorganisms in the beer so that a beer treated with a silica gel will have imparted thereto an improved biological stability. This improvement of the biological stability of the beer, when a most finely ground silica gel is employed, is still conditional also on a consolidation of the filter cake and perhaps also on the silica gel adsorbing under certain conditions substances from the beer the absence of which leads to a delayed development of microorganisms in the beer.

Finally, it has still been found that the most finely ground silica gel offers the possibility of eliminating flavour bearing alubmen-tannin compounds from the beer to mature its flavour by the treatment with the silica gel. The maturing effect permits in turn a considerable shortening of the aging period of the beer and is quite generally of advantage in all cases in which difficulties arise in connection with these flavour bearing substances.

It has been found in technical operation that for the treatment of the beer for the above mentioned purposes, 50–100 g. of most finely ground silica gel will have to be employed for each hl. of beer dependent upon the brewery technique used.

It has unexpectedly been found that the amount of silica gel required may be considerably reduced if the beer is additionally treated with aluminum silicates of the montmorillonite species simultaneously with the silica gel treatment or before or after such silica gel treatment. When so treated the same biologically and physico-chemically stabilizing and likewise flavour correcting effect will occur.

Adsorbing means to treat the beer of the montmorillonite type are for instance disclosed in the German Patent 682,788. However, only the strongly swelling types of these silicates are practically of importance.

The stabilizing effect of these strongly swelling types of the montmorillonite is comparable to that of the silica gel. The types which are but little swelling and which are made for instance by thermal or acid treatment, as well as also calcium bentonite, exhibit a substantially reduced stabilizing effect.

The montmorillonite material which has a considerable swelling capacity, however, presents several decisive drawbacks in connection with the treatment of beer. For example, the adsorption effect has relatively little selectivity, i.e. it is not only the albumen substances, which are responsive for the occurrence of turbidities in the beer, that are removed from the beer by this material but, also other substance which one would like to leave in the beer for reasons connected with froth formation and flavour are removed from the beer along with the albumen. Besides, the strongly swelling montmorillonite material is very difficult to handle. One has to charge it into the beer in a pre-swelled condition and a very fine suspension that cannot be filtered is formed so that a special sedimentation process is necessary to subsequently remove the montmorillonite. Finally, substantial beer losses up to 5% occur during the elimination of the voluminous montmorillonite sediment.

The application of the lesser swelling types of the montmorillonite material which would be much more advantageous from a technical viewpoint is not possible because of their limited effectiveness.

It has now been found that, if the beer is treated not only with silica gel but in addition with montmorillonite, a strongly increased effect may be observed. However, it is a decisive prerequisite that the silica gel possess the above mentioned properties. If the beer is treated with silica gel and with said strongly swelling montmorillonite material, i.e. with adsorbing agents which, if used by themselves would bring about the same stability, then after the combined application, the beer is found to be better in its albumen stability than if the same amounts of the one or other component had been used alone.

If, to stabilize the beer, only a small amount of the swelling modification of the montmorillonite which would have little effect by itself, is used together with the silica gel, then the effect of the combination is about as good as the effect of the silica gel alone, which by itself is much superior to the non-swelling montmorillonite material as regards the stabilizing effect.

The advantage of the combined application in accordance with the invention of silica gel and montmorillonite materials resides on the one hand that—as already explained—the albumen stabilizing effect is considerably enhanced. This results in an improved economy of the combination. In addition, the frothing property and the gustatory (or sense of taste) properties of the beer are but little impaired in comparison with the sole application of montmorillonite. In the case of a combination of silica gel with little or non-swelling montmorillonite modifications the advantage is also an economic one because the montmorillonite materials are considerably cheaper to produce than the silica gel. With this combination, the advantages connected with the application of the silica gel are maintained to the effect: that the material may be removed from the beer at any time after a short period of contact by filtration, i.e. without any long-lasting sedimental processes; that the application is possible without any beer losses; and that the influence of the adsorbing agents on the beer does not prejudice the flavour or the frothing property of the beer.

In accordance with the invention, the proportion of silica gel of the entire amount of adsorbing agents may be reduced ⅓ to ¼.

Especially good results are obtained when using the combination if the silica gel is coarse-pored with an inner surface of about 200 to about 400 m.$^2$/g. a pore volume of about 0.6 to about 1.2 ml./g. and a pore diameter of about 60 to about 150 A.

It is also recommended that the silica gel employed exhibit a weakly acid or neutral reaction such that it has a pH value of more than 4.0 and below 8.0 in a 5% suspension in distilled water. Finally, it may be recommended that the grinding of the silica gel be carried to such an extent that more than 90% by weight of the particles are smaller than 40 micron.

Especially favourable results will be obtained if the silica gel which is used in combination with the aluminum silicates of the montmorillonite species is coarse-pored; has a weakly acid or neutral reaction; and is also especially finely ground in the manner as characterized above.

With the combined application of silica gel and montmorillonite, the improvement of the biological keeping property of the beer and the removal of the flavour imparting substances from the beer, occur about in the same measure as with the application of silica gel alone. But as these quantities canot be exactly represented by experiments only the change of the albumen stability which may be measured relatively exactly, is shown in the following examples in order to demonstrate the effect of the combination silica gel and montmorillonite.

Finally, it has been found that for the treatment of beer not only a combination of the silica gel indicated with aluminum silicates of the montmorillonite species is suitable; but moreover, to carry out the present invention, the silica gel may quite generally be combined with finely ground layered minerals having a grating or lattice capable of swelling. In this case, both the strongly swelling modifications of these layered minerals (and minerals the swelling capacity of which has been reduced or abolished by acid or thermal treatment) may be used. Layered minerals in accordance with the above include in addition to montmorillonite for instance the following:

Beidellite
Nontronite
Vermiculite
Hectorite
Illite
Sepiolite

Example 1.—Combination of high-degree swellable montmorillonite with silica gel

A strongly swellable commercially available preparation which is generally used for beer stabilization was used as the montmorillonite material. The silica gel was likewise a commercially available preparation for the stabilization of beer with an inner surface of 375 m.$^2$/g., a pore volume of 0.83 ml./g. and a pore diameter of 89 angstrom units which was so finely ground that about 80% passed through a screen having a mesh size of 44 microns; pH value in a 5% aqueous solution was 6.4.

After a period of storage of 6 weeks, a beer having 12.4 stock wort percentage was transferred under pressure from two 500 hl. tanks of a brewery into 6 tanks of 100 hl. capacity each. During the transfer under pressure, suspension of the above mentioned stabilizing agents were introduced into the beer line. After 7 days, the 6 tanks were racked one by one.

To the beer type F, 50 g./hl. of silica gel were additionally added in a metering action at a filter apparatus of the silting type during the final filtering of the beer. The types of beer were examined after pasteurization. The following additives were employed:

(A) Control beer without additives.
(B) 200 g./hl. of swellable montmorillonite.
(C) 150 g./hl. silica gel.
(D) 50 g./hl. of swellable montmorillonite.
(E) 50 g./hl. silica gel.
(F) 50 g./hl. of montmorillonite in the storage cellar, and 50 g./hl. silica gel during filtration.

RESULTS OF ANALYSES

|  | A | B | C | D | E | F |
|---|---|---|---|---|---|---|
| Total nitrogen (mg./100 ml.) | 76.6 | 63.2 | 71.2 | 72.0 | 74.8 | 70.8 |
| Cold turbidity 5 days after racking (EBC units) | 6 | 0 | 0 | 0 | 0 | 0 |
| Cold turbidity after 14 days at 40° C. and 48 hours in ice | 20 | 2.4 | 3.2 | 10.4 | 6.3 | 2.7 |
| Permanent turbidity after 4 weeks at 40° C | 8.2 | 0.4 | 1.1 | 4.3 | 2.9 | 1.0 |
| Froth immediately after racking (Ross and Clark) | 129 | 104 | 125 | 122 | 129 | 122 |

The above figures show that with the racking F where 50 g./hl. montmorillonite were combined with 50 g./hl. of silica gel, the cold turbidity after 14 days at 40° C. was about the same as for the rackings B and C, where a stabilizing had been effected only with montmorillonite and silica gel, respectively. The subsequent treatment of the beer with silica gel and montmorillonite yields approximately the same stabilization effect as the treatment with a 1½–2-fold quantity of one of said substances alone. Also with respect to the frothing capacity the beer F was still rather good as compared for instance with the beer B where the frothing values had been considerably reduced by the treatment solely with montmorillonite.

Example 2.—Combination of finely ground bleaching earth of the montmorillonite species roasted at a temperature between 400 and 500° C. with silica gel The commercially available montmorillonite preparation of Example 1 had been roasted for 6 hours at a temperature of 400 to 500° C. and subsequently finely ground. As a silica gel, the same preparation was used as in Example 1.

An untreated, bright strong beer with 11.8% basic or stock wort contents was racked into barrels holding 100 litres. The adsorption agents suspended in small amounts of water before were charged into the barrels. The barrels were rolled. After a period of storage of 4 days at a temperature of 0° C., the samples of beer were filtered and put into bottles. The following tests were carried through in details:

(A) Untreated beer for comparison
(B) 50 g./hl. montmorillonite
(C) 100 g./hl. montmorillonite
(D) 50 g./hl. silica gel
(E) 100 g./hl. silica gel
(F) 25 g./hl. montmorillonite and 25 g./hl. silica gel
(G) 50 g./hl. montmorillonite and 50 g./hl. silica gel.

RESULTS OF ANALYSES

|  | A | B | C | D | E | F | G |
|---|---|---|---|---|---|---|---|
| Total nitrogen (mg./100 ml.) | 64.3 | 60.3 | 58.0 | 62.1 | 60.1 | 61.8 | 58.8 |
| Froth (by Ross and Clark) | 127 | 120 | 116 | 126 | 124 | 124 | 122 |
| Cold turbidity after 7 days at 40° C. and 48 hours in ice (EBC units) | >20 | 9.0 | 6.8 | 5.9 | 3.8 | 5.6 | 3.4 |

From the above test it will be seen that the beer F where 50 g. of the mixture were employed, is much better stabilized than the beer types B or D holding 50 g./hl. of the individual components. Also the beer G holding 50 g. of each of the two components is slightly more stable than the beer E with 100 g. silica gel, although based on the results of beer C and E a stability value lying about between those for the two types of beer would have had to be expected.

Example 3.—Combination of acid activated bleaching earth with silica gel

The acid activated bleaching earth was selected from the montmorillonite species and derived from the stores at Moosburg, Bavaria. It was employed in a finely ground condition. The silica gel employed was the same as in Example 1.

In a scall scale experiment, different amounts of the adsorbing agents were added each to two litres of beer. After having been strongly shaken through, the adsorbing agents were allowed to settle down for four days at a temperature of 0° C. Then, the samples were filtered through a small filter and racked into bottles.

(A) No additives
(B) 50 g./hl. bleaching earth (= 1 g./2 l.)
(C) 100 g./hl. bleaching earth
(D) 50 g./hl. silica gel
(E) 100 g./hl. silica gel
(F) 25 g./hl. bleaching earth and 25 g./hl. silica gel
(G) 50 g./hl. bleaching earth and 50 g./hl. silica gel Results of analyses.—Cold turbidity after 5 days at 40° C. and 48 hours in ice (EBC units)

A ---- 12
B ---- 8.7
C ---- 5.1
D ---- 3.7
E ---- 2.1
F ---- 3.6
G ---- 2.3

In this test, the sole application of bleaching earth entailed only a moderately improved stability with the beers B and C. The common application of bleaching earth and silica gel with the beer types F and G, however, resulted into approximately the same stability as with the beer types D and E, where, however, double the amount of the more effective stabilizing agent silica gel was employed.

Example 4.—Combination of washed crude bentonite with silica gel

The crude bentonite employed was a washed and dried as well as finely ground material from the stores near Moosburg. The silica gel was identical with the sample of Example 1.

A scall scale test same as with Example 5 was carried through:

(A) No additives
(B) 50 g./hl. crude bentonite
(C) 100 g./hl. crude bentonite
(D) 50 g./hl. silica gel
(E) 100 g./hl. silica gel
(F) 25 g./hl. crude bentonite+25 g./hl. silica gel
(G) 50 g./hl. crude bentonite+50 g./hl. silica gel Results of analyses.—Cold turbidities after 5 days at 40° C. and 48 hours in ice (EBC units)

A ---- 12
B ---- 10.8
C ---- 8.2
D ---- 3.7
E ---- 2.1
F ---- 4.1
G ---- 2.4

In this test, the stabilizing effect of the crude material was still worse than that of the acid activated bentonite. In spite of this, it was found that in the case of a combination with silica gel, the mixture was approximately just as effective as the silica gel alone although it contained only half the amount of effective silica gel.

Example 5.—Combination of calcium bentonite and extra finely ground silica gel The calcium bentonite was only a moderately swellable material which is commercially available and which is used for the treatment of vine. The extra fine silica gel showed the following values:

Surface, 353 m.²/g.
Pore volume, 0.83 ml./g.
Pore diameter, 94 A.
Particle size, 95% by weight smaller than 44 microns
pH value in a 5% aqueous solution, 6

A 12.6% bright strong beer was reacted with adsorption agents in 100 l. barrels. The barrels were tilted and rolled and after a storage period of 7 days at 0° C. the beer was filtered and racked. The following batches were prepared in detail:

(A) No additions
(B) 150 g./hl. calcium bentonite
(C) 80 g./hl. silica gel
(D) 40 g./hl. silica gel+75 g./hl. calcium bentonite

RESULTS OF ANALYSES

|  | A | B | C | D |
|---|---|---|---|---|
| Total nitrogen (m./100 ml.) | 67.3 | 60.2 | 63.6 | 63.0 |
| Cold turbidity after 7 days at 40° C. and 2 days in ice (EBC units) | 20 | 14 | 1.3 | 1.8 |

In this test, the bentonite again is relative little effective. In spite of this, the mixture of bentonite and silica gel brings about approximately an equally good stabilization as the silica gel alone, although only half the amount of silica gel was employed and bentonite which alone has but little effectiveness.

Example 6.—Combination of extra finely ground silica gel and acid activated bleaching earth The silica gel is the same material as employed in Example 5, and the acid activated bleaching earth is the material used in Example 3.

A bright strong beer that had been stored for 8 weeks was racked from a 500 hl. tank into 4 tanks holding 100 hl. each. Tank A remains untreated as a beer for comparison.

Tank B is charged with 50 g./hl. silica gel in the racking operation under pressure.

Tank C is charged with 100 g./hl. acid activated bleaching earth in the racking operation under pressure.

Tank D is charged with 50 g./hl. extra finely ground silica gel during the transferring operation under pressure and 50 g./hl. bleaching earth during the filtering operation.

The four tanks are left in the storage cellar for 7 days for sedimentation of the adsorption agents. Thereafter, they are each of them filtered through a fresh filter, racked and pasteurized. With the beer of type D 50 g./hl. of acid activated bleaching earth are still additionally added during the filtering operation together with the filtration kieselguhr.

RESULTS OF ANALYSES

|  | A | B | C | D |
|---|---|---|---|---|
| Froth (by Ross and Clark) | 122 | 121 | 118 | 121 |
| Cold turbidity after 7 days at 40° C. and 2 days in ice (EBC units) | 20 | 4.3 | 15 | 1.7 |
| Permanent turbidity after 4 weeks at 40° C. (EBC units) | 10.6 | 0.9 | 6.4 | 1.0 |

With this test, the acid activated bleaching earth again appears to be little effective. In spite of this, it improves the stability of the beer D which has been in contact with silica gel before, additionally and in an unexpectedly high degree.

Example 7.—Combination of silica hydrate with washed crude bentonite

The silica hydrate was a sample which had been made available from a silica gel factory. This silica hydrate contained about 35% $SiO_2$ and about 65% of water. The material was a silica gel that had been caused to solidify and which had already been dried but had not yet shrunk. In an aqueous suspension, a pH value of 7 to 8 resulted. In the respective factory, a coarse-pored Xerogel is made of the present material by drying between 200 and 300° C. The present test sample was so finely ground that about 50% passed through a sieve of 100 mesh. As a crude bentonite, the material of Example 4 was used.

A small scale test was carried out with 2 l. of beer as in Example 3. In this text, finely ground silica gel was still employed additionally for comparison (preparation of Test 1).

The batches were as follows:

(A) No additions
(B) 100 g./hl. silica gel having a hydrate character
(C) 100 g./hl. crude bentonite
(D) 50 g./hl. silica gel having a hydrate character
    +50 g./hl. crude bentonite
(E) 50 g./hl. silica gel (Xerogel of Test 1)
(F) 25 g./hl. silica gel (Xerogel)
    +25 g./hl. crude bentonite Results of analyses.—Cold turbidity after 5 days at 40° C. and 48 hours in ice A ---------------------------------------- 18
B ---------------------------------------- 13
C ---------------------------------------- 10
D ---------------------------------------- 13
E ---------------------------------------- 3.8
F ---------------------------------------- 4.0

The above test shows that the silica gel having a hydrate character has only a very small stabilizing effect in an order of size approximately corresponding to the effectiveness of the crude bentonite. The mixture of both adsorption agents D was likewise but little effective. Contrary to this, with the test E, a considerable improvement of the stability was obtained, although only half the amount of silica gel was employed. It will be seen how the effectiveness of the Xerogel essentially differs from that of the silica gel having a hydrate character. With F it was then found again that the mixture of Xerogel and crude bentonite had about the same effect as the Xerogel alone although the crude bentonite alone was but relatively little effective C.

Example 8.—Combination of small-pored silica gel with acid activated bleaching earth The acid activated bleaching earth was the same material as in Example 3.

As the small-pored silica gel, the material having the following properties was employed:

Inner surface, 651 m.²/g.
Pore volume, 0.48 ml./g.
Pore diameter, 18 A.
Grinding so fine that 70% by weight passed through a sieve of 325 mesh, i.e. were smaller than 44/μ.

A small-scale test was carried through with 2 l. of beer as in Example 3. The batches were as follows:

(A) No additions at all
(B) 100 g./hl. silica gel
(C) 100 g./hl. acid activated bentonite
(D) 50 g./hl. silica gel+50 g./hl. of acid activated bentonite.

Results of analyses.—Cold turbidity after 4 days at 40° C. and 48 hours in ice

A ---------------------------------------- 18
B ---------------------------------------- 14
C ---------------------------------------- 8.6
D ---------------------------------------- 13.2

This test shows that the small-pored silica gel alone but also in combination with the acid activated bentonite is no usable stabilizing agent same as is the case with the acid activated bentonite if used alone which is not very effective either.

Example 9.—Combination of silica gel-washed crude bentonite

This test is to show once more how essential it is that for the stabilization of beer a silica gel is employed which has the required properties and that, furthermore, mixtures of silica gel with an aluminum silicate of the montmorillonite species are making usable stabilizing agents only if the silica component of the mixture answers the requirements as indicated.

The washed crude bentonite was the same as with Example 4. As a silica gel, two different types of materials were used, namely different as regards both the fine structure and the degree of grinding.

Silica gel A: inner surface 350 m.²/g.; pore volume 1.0 ml./g.; pore diameter 114 A.

Silica gel B: inner surface 575 m.²/g.; pore volume 0.72 ml./g.; pore diameter 55 A.

The pH values of both silica gels in a 5% aqueous suspension were 6–6.5.

Therefore, the material B was product which as regards its fine structure was at the limit of the range claimed.

Of both silica gels, 3 samples were used, which differed by their degrees of grinding.

| Grinding | A1 | A2 | A3 |
|---|---|---|---|
| 0–20/μ | 12% | 46% | 63% |
| 20–40/μ | 13% | 21% | 19% |
| Above 40/μ | 75% | 33% | 18% |

| | B5 | B2 | B3 |
|---|---|---|---|
| 0–20/μ | 22% | 36% | 60% |
| 20–40/μ | 19% | 30% | 18% |
| Above 40/μ | 59% | 34% | 22% |

Test arrangement 1 g. of the adsorption agents were added to 2 l. of beer (=50 g./hl.). After a period of contact of 2 days at 0° C., the samples were centrifuged off and the clear beer racked into bottles. These bottles were kept at a temperature of 40° C. for three days and then kept in ice for one day. The control beer was treated absolutely in the same way without the addition of adsorbing agents. The cold turbidity was expressed in percent of the cold turbidity resulting with beer without additions. The test was carried through with altogether 6 different types of beer from different breweries. The mean values from the 6 types of beer are compiled below. In addition to the silica gels A1 to A3 as well as B1 to B3, a combination of like parts of A1 with crude bentonite and B1 with crude bentonite, likewise 50 g./hl. of the mixture, was still employed.

Cold turbidity (in percent of the turbidity of the control beer)

A1 ---------------------------------------- 41.4
A2 ---------------------------------------- 27.9
A3 ---------------------------------------- 24.6
B1 ---------------------------------------- 64.1
B2 ---------------------------------------- 49.5
B3 ---------------------------------------- 31.6
A1+Bento. --------------------------------- 38.2
B1+Bento. --------------------------------- 72.0

A comparison of the values of A1 to B3 shows at first how essential it is for the stabilization effect to maintain the fine structure (inner surface, pore volume, pore diameter). With a comparable grinding of the samples, the material A was considerably more effective than the material B. However, one may obtain by carrying the grinding correspondingly far that also the silica gel B brings about a usable stabilizing effect. Furthermore, the combination of A1 with bentonite will then show that in this case the crude bentonite which, on the basis, for instance of the results of Example 4, is not very much effective alone, may replace a part of the active silica gel. The mixture had about the same effect as the material A1 alone. In the case of the material B1, neither the silica gel nor the mixture with crude bentonite would be suitable for the stabilization of beer.

Example 10.—Combination of silica gel with different layered minerals

The silica gel was identic with the material of Example 1. The layered minerals were in a finely ground condition. The arrangement of the test was as in Example 3; the batches were as follows:

(A) No additions
(B) 100 g./hl. silica gel
(C) 100 g./hl. hectorite
(D) 100 g./hl. acid activated hectorite
(E) 100 g./hl. sepiolite
(F) 100 g./hl. illite
(G) 50 g./hl. silica gel+50 g./hl. hectorite
(H) 50 g./hl. silica gel+50 g./hl. activated hectorite
(I) 50 g./hl. silica gel+50 g./hl. sepiolite
(K) 50 g./hl. silica gel+50 g./hl. illite.

Cold turbidity of the beer types treated after 4 days at 40° C. and 48 hours in ice (EBC units)

A _____ 12.0
B _____ 1.9
C _____ 7.5
D _____ 3.8
E _____ 3.9
F _____ 10.2
G _____ 2.4
H _____ 1.8
I _____ 1.7
K _____ 2.3

The above values, above all those of the batches G to K show that here the mixture of layered mineral and silica gel have a similarly stabilizing effect as the batch B with silica gel alone, while the layered minerals alone in the batches C to F have a less distinct albumen stabilizing effect.

What I claim is:

1. A method of treating beer with adsorption agents with a view to increase the albumen stability and furthermore also to improve the biological keeping properties as well as gustatory properties of said beer which comprises adding to the finished beer during filtering of deposits therefrom both aluminum silicates of the montmorillonite species as well as finely ground coarse to medium-pored silica gel in the state of a xerogel having an inner surface of 200 to 600 m.$^2$/g., a pore volume of about 0.5 to 1.5 ml./g. and a pore diameter of 40 to 180 angstrom units as adsorbing agents, said coarse to medium-pored silica gel being so finely ground that at least 75% by weight thereof has a grain size of less than 40 microns, said silica gel being added at an amount less than 100 g./hl. of beer.

2. A method as claimed in claim 1 in which said silica gel and said aluminum silicate of the montmorillonite species being simultaneously added to said beer.

3. A method as claimed in claim 1 in which said silica gel and said aluminum silicates of the montmorillonite species being added to said beer at different times.

4. A method of treating beer with adsorption agents with a view to increase the albumen stability and furthermore also to improve the biological keeping properties as well as gustatory properties of said beer which comprises adding to said beer at first a first adsorption agent and thereafter a second adsorption agent, said first adsorption agent being selected from the group of aluminum silicates of the montmorillonite species and said second adsorption agent being a finely ground coarse to medium-pored silica gel in the state of a xerogel having an inner surface of 200 to 600 m.$^2$/g., a pore volume of about 0.5 to 1.5 ml./g. and a pore diameter of 40 to 80 angstrom units, said silica gel being so finely ground that at least 75% by weight thereof has a grain size of less than 40 microns, said silica gel being added at an amount less than 100 g./hl. of beer.

5. A method as claimed in claim 1 in which said aluminum silicate is being used as bentonite.

6. A method as claimed in claim 1 in which said aluminum silicate is being used in the form of roasted bleaching earth of the montmorillonite species.

7. A method as claimed in claim 1 in which said aluminum silicate is being used in the form of bleaching earth which has been roasted at a temperature of between 400 and 500° C.

8. A method as claimed in claim 1 in which said aluminum silicate is being used as acid activated bentonite.

9. A method as claimed in claim 1 in which said aluminum silicate is being used as elutriated calcium bentonite.

10. A method as claimed in claim 1 in which said aluminum silicate is being used in the form of an acid activated bleaching earth of the montmorillonite species.

11. A method as claimed in claim 1 in which the entire addition of adsorbing agents consists up to three quarters of said aluminum silicate the remainder consisting of said silica gel.

12. A method as claimed in claim 1 in which said silica gel is coarse-pored having an inner surface of about 200–400 m.$^2$/g., a pore volume of about 0.5–1.2 ml./g. and a pore diameter of about 60 to 150 angstrom units.

13. A method as claimed in claim 1 in which said silica gel exhibits a weakly acid or neutral reaction such that it has a pH value of more than 4.0 and below 8.0 in a 5% suspension in distilled water.

14. A method as claimed in claim 1 in which the grinding of said silica gel is carried to so extreme an extent that more than 90% by weight are smaller than 40 microns.

15. A method of treating beer with adsorption agents with a view to increase the albumen stability and furthermore also to improve the biological keeping properties as well as gustatory properties of said beer which comprises adding to said beer both an aluminum silicate having a swellable lattice as well as finely ground coarse to medium-pored silica gel in the state of a xerogel having an inner surface of 200 to 600 m.$^2$/g., a pore volume of about 0.5 to 1.5 ml./g. and a pore diameter of 40 to 180 angstrom units as adsorbing agents, said coarse to medium-pored silica gel being so finely ground that at least 75% by weight thereof has a grain size of less than 40 microns.

16. A method as claimed in claim 15 in which said aluminum silicate used is employed in the form of a strongly swellable modification thereof.

17. A method as claimed in claim 15 in which the swelling capacity of said aluminum silicate is at least reduced by a thermal treatment.

18. A method as claimed in claim 15 in which said aluminum silicate is employed in an acid activated condition.

19. A method of treating beer with absorption agents with a view to increase the albumen stability and furthermore also to improve the biological keeping properties as well as gustatory properties of said beer which comprises adding to said beer both aluminum silicates of the montmorillonite species as well as finely ground coarse to medium-pored silica gel in the state of a xerogel having an inner surface of 200 to 600 m.$^2$/g., a pore volume of about 0.5 to 1.5 ml./g. and a pore diameter of 40 to 180 angstrom units as adsorbing agents, said coarse to medium-pored silica gel being so finely ground that at least 75% by weight thereof has a grain size of less than 40 microns, said silica gel being added at an amount less than 100 g./hl. of beer, and separating said aluminum silicate and said silica gel from said beer.

References Cited

UNITED STATES PATENTS

| | | |
|---|---|---|
| 2,291,624 | 8/1942 | Heimann et al. _____ 99—48 |
| 2,316,241 | 4/1943 | Heimann _____ 99—48 |
| 2,433,411 | 12/1947 | Wallerstein _____ 99—48 |
| 3,163,538 | 12/1964 | Raible _____ 99—48 |

FOREIGN PATENTS

| | | |
|---|---|---|
| 465,692 | 5/1937 | Great Britain. |
| 528,288 | 7/1956 | Canada. |
| 247,223 | 5/1963 | Australia. |

LIONEL M. SHAPIRO, *Primary Examiner.*

D. M. NAFF, *Assistant Examiner.*